Oct. 22, 1963   G. W. RIECKENBERG   3,107,542
MOTION-TRANSMITTING MECHANISM
Filed Feb. 28, 1961

INVENTOR.
GEORGE W. RIECKENBERG
BY W. E. Recktenwald
K. E. Walden
ATTORNEY

United States Patent Office 3,107,542
Patented Oct. 22, 1963

3,107,542
MOTION-TRANSMITTING MECHANISM
George W. Rieckenberg, Hobart, Ind., assignor to The Anderson Company, a corporation of Indiana
Filed Feb. 28, 1961, Ser. No. 92,368
10 Claims. (Cl. 74—95)

This invention relates generally to motion-transmitting mechanisms and more particularly to the operative connection between a windshield wiper motor and an oscillatably driven shaft on which a windshield wiper arm-and-blade assembly is mounted.

An object of the invention is to provide a motion-transmitting mechanism including a reciprocable link and a shaft oscillatingly driven thereby, wherein the maximum angular velocity of the shaft occurs at the middle of its angle of displacement and the minimum angular velocity occurs at the ends of its angle of displacement.

Another object of the invention is to provide an improved motion-transmitting mechanism particularly adapted to windshield wiper drive mechanisms, whereby the tendency of the wiper blade to overtravel under certain conditions is eliminated.

A further object of the invention is to provide a windshield wiper drive mechanism designed to impart greater torque to a windshield wiper arm at the ends of its angle of displacement, whereby a wiper blade can be more readily freed from ice frozen on a windshield.

A still further object of the invention is to provide an improved windshield wiper drive mechanism for driving a windshield wiper arm-and-blade assembly through the central portion of its wiping area at a greater speed than formerly, whereby vision is improved and the action of the wiper is less distracting than formerly.

Yet another object of the invention is to provide an improved windshield wiper drive mechanism which can be designed for operating a wiper blade over a larger wiping area extending closer to the edges of the windshield.

Another object of the invention is to provide an improved windshield wiper drive mechanism capable of accurately controlling the movement of a wiper blade so that mechanism normally required for a separate parking position of the blade can be eliminated.

Other objects and advantages of the invention will become apparent after the description hereinafter set forth is considered in conjunction with the drawing annexed hereto.

Figure 1:
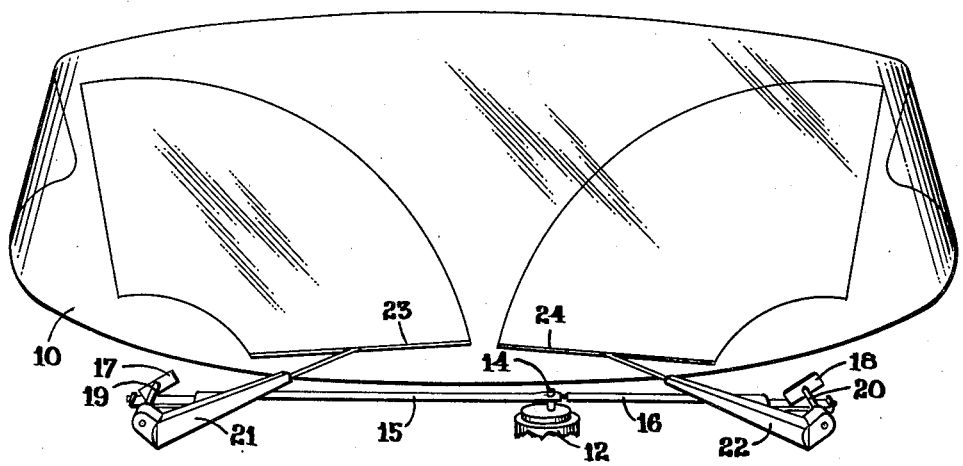
FIGURE 1 is a perspective view of a windshield showing the improved windshield wiper drive mechanism of my invention associated therewith.

In FIGURE 1, a windshield is indicated by numeral 10. A motor 12 is provided for eccentrically driving a crank pin 14 to which reciprocable links 15 and 16 are pivotally connected. At their other ends links 15 and 16 are respectively operatively connected to generally rectangular pulleys 17 and 18 mounted respectively on pivot shafts 19 and 20, which are mounted in bearings not shown.

On the ends of shafts 19 and 20 opposite from pulleys 17 and 18, windshield wiper arms 21 and 22, carrying wiper blades 23 and 24, are respectively mounted.

Figure 2:
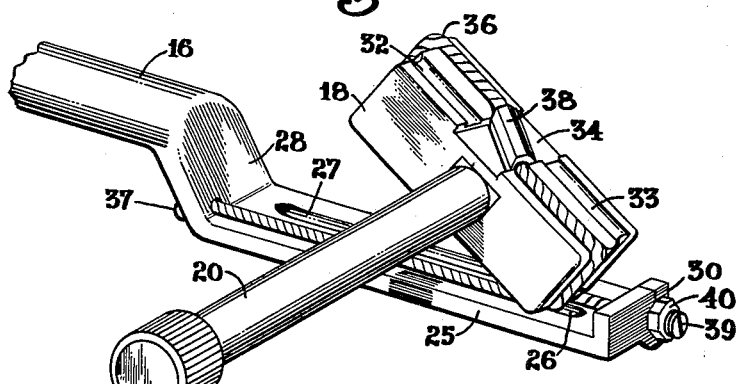
FIGURE 2 is an enlarged perspective view of the drive mechanism of my invention.

The operative connection between link 16 and rectangular pulley 18 is illustrated in FIGURE 2. The operative connection between link 15 and pulley 17 is similar and will not be separately described.

The link 16 is provided with an offset portion 25 having parallel grooves 26 and 27 therein. An offsetting portion 28 and a bent-up end portion 30 provide abutments for a purpose to be hereinafter described.

The pulley 18 is provided with parallel grooves 32 and 33 extending around the periphery thereof and a notch 34 is formed near the mid-portion of the top of said pulley.

A flexible connecting means, illustrated herein as a cable 36, is provided to operatively connect links 16 and pulley 18. The cable 36 is provided with three lugs 37, 38 and 39 clamped securely thereon. Lug 37 abuts the outside of offsetting portion 28. The cable extends from lug 37 through offsetting portion 28, along groove 26 in offset portion 25, partially around pulley 18 in groove 32 thereon, through lug 38, which cooperates with notch 34 to prevent slipping of the cable on the pulley, the rest of the way around the pulley in groove 33 thereon, and along groove 27 in offset portion 25 to lug 39, which is provided with a threaded end portion extending through bent-up end portion 30 for receiving a nut 40 abutting portion 30 to provide means for adjusting the tension in the cable.

It will be apparent that as link 16 is moved longitudinally in one direction, cable 36 will be unwound at one end from pulley 18 and wound up at the other end on the pulley. Since lug 38 cooperates with notch 34 to prevent slipping of cable 36 about the pulley, the pulley and shaft 20 will be turned as link 16 is moved longitudinally. Link 16 will also have a component of movement toward and away from shaft 20, since pulley 18 is not circular. Movement of link 16 longitudinally in the other direction will turn pulley 18 and shaft 20 in the opposite direction so that reciprocation of link 16 will oscillate the pulley and shaft.

Figure 3:
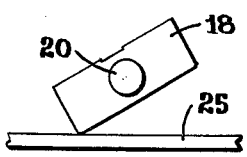
FIGURES 3, 4 and 5 are schematic diagrams illustrating portions of the improved motion-transmitting device in various relative positions.
Figure 4:
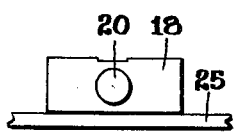
Figure 5:
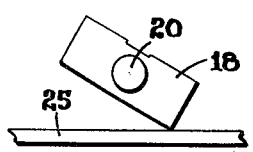

In the schematic diagram of FIGURE 5, the relative positions of pulley 18 and portion 25 of link 16 might be said to correspond to their relative positions in FIGURE 2. It can be assumed that portion 25 has reached its extreme left position and pulley 18 has reached its extreme clockwise position. FIGURE 4 shows the relative positions of pulley 18 and portion 25 when they are midway between their extreme positions. In FIGURE 3, it can be considered that portion 25 has reached its extreme right position and pulley 18 has reached its extreme counterclockwise position.

Due to the generally rectangular shape of the pulley 18, the distance between shaft 20 and portion 25 will vary as link 16 is moved longitudinally. The shaft is closest to portion 25 in FIGURE 5 and farthest away from portion 25 in FIGURES 3 and 5. Assuming that portion 25 moves in equal increments of movement, it will be seen that movement through an increment of movement from the position in FIGURE 4 will displace shaft 20 through a greater angle than movement through an increment of movement from the positions of FIGURES 3 and 5, because in FIGURE 4 portion 25 acts through a shorter radius from the center of shaft 20 than in FIGURES 3 and 5. For this reason, shaft 20 will be rotated through its middle position faster than it would be if the pulley 18 were circular and had a diameter equal to the length of the rectangular shape. At the same time, a greater torque will be applied to shaft 20 when portion 25 is urged from the positions in FIGURES 3 and 5 than when it is urged from the position of FIGURE 4, because in FIGURES 3 and 5 portion 25 acts through a longer radius from the center of shaft 20 than in FIGURE 4. Thus, in comparison with a circular pulley, the generally rectangular pulley 18 will result in greater speed of travel of a wiper blade through the center portion of its wiping area and a slower speed with greater torque at the opposite extremes of the wiping area.

The slower speed at the opposite extremes of the wiping area eliminates "whip" of the wiper blade, overtravel of the wiper blade beyond the designed wiping area, and banging of the wiper blade into the molding around the windshield. Therefore, a larger wiping area can be designed, extending closer to the molding around the windshield, and costly mechanism required to provide a separate parking position of the wiper blades outside the normal wiping area can be eliminated. Further, the greater torque at the opposite extremes of the wiping area enables the wiper blade to be more readily broken loose from ice frozen on the windshield and to more easily push snow on the windshield.

Various modifications may be made in the structure disclosed without departing from the spirit and scope of the invention; and, therefore, I do not wish to be understood as limiting the invention to the exact forms, constructions, arrangements and combinations of parts herein shown and described.

I claim:

1. A motion-transmitting mechanism comprising a shaft mounted for oscillatory movement, a pulley mounted on said shaft for oscillation therewith, said pulley having a generally flat peripheral edge portion, a reciprocable link having a generally flat end portion presentable to the flat peripheral edge portion of said pulley, and flexible connecting means operatively connecting said link and pulley for oscillation of said pulley and shaft by reciprocation of said link, said flat portions lying adjacent and parallel during a middle position of oscillation of the shaft and angularly disposed when oscillated to a position on either side of the middle position.

2. A motion-transmitting mechanism comprising a shaft mounted for oscillatory movement, a pulley mounted on said shaft for oscillation therewith, said pulley having a generally flat peripheral edge portion, a reciprocable link having a generally flat end portion presentable to the flat peripheral edge portion of said pulley, and flexible connecting means operatively connecting said link and pulley for oscillation of said pulley and shaft by reciprocation of said link, said flexible connecting means including portions extending from opposite ends of said generally flat peripheral edge portion of said pulley to the respective remote opposite ends of said generally flat end portion of said link, and means on the flat surfaces cooperating with the flexible means to prevent relative lateral displacement of the pulley and link end.

3. A motion-transmitting mechanism comprising a shaft mounted for oscillatory movement, a pulley mounted on said shaft for oscillation therewith, said pulley having a generally flat peripheral edge portion, a reciprocable link having a generally flat end portion presentable to the flat peripheral edge portion of said pulley, and flexible connecting means operatively connecting said link and pulley for oscillation of said pulley and shaft by reciprocation of said link, said generally flat peripheral edge portion of said pulley and said generally flat end portion of said link being parallel and substantially coplanar when said pulley is in the middle position between the extreme positions of oscillation and said link is in the middle position between the extreme positions of reciprocation, each of said flat portions having grooves matching with the other and receiving the flexible connecting means therebetween.

4. A motion-transmitting mechanism comprising a shaft mounted for oscillatory movement, a pulley mounted on said shaft for oscillation therewith, said pulley having a generally flat peripheral edge portion having a pair of parallel grooves extending therealong, a reciprocable link having a generally flat end portion presentable to the flat peripheral edge portion of said pulley and having a pair of parallel grooves extending therealong, and a flexible cable operatively connecting said link and pulley for oscillation of said pulley and shaft by reciprocation of said link, said cable being engageable with said grooves and having portions movable from a groove on said pulley to a groove on said link and vice versa as said link is reciprocated to oscillate said pulley.

5. A motion-transmitting mechanism comprising a shaft mounted for oscillatory movement, a generally rectangular pulley mounted on said shaft for oscillation therewith, a reciprocable link having a generally flat end portion presentable to a peripheral side of said pulley, and flexible connecting means operatively connecting said link and pulley for oscillation of said pulley and shaft by reciprocation of said link, said rectangular pulley having parallel grooves around its periphery and matching parallel grooves in the flat end and receiving the flexible means therebetween.

6. A motion-transmitting mechanism comprising a shaft mounted for oscillatory movement, a generally rectangular pulley mounted on said shaft for oscillation therewith, said pulley having a pair of parallel grooves extending along a peripheral side thereof, a reciprocable link having a generally flat end portion presentable to said grooved side of said pulley and having a pair of parallel grooves extending therealong, and flexible connecting means operatively connecting said link and pulley for oscillation of said pulley and shaft by reciprocation of said link, said flexible connecting means including a first portion extending from an end of said grooved side of said pulley to the respective remote end of said generally flat end portion of said link and being engageable with one of said grooves on the side of said pulley and one of said grooves on the generally flat end portion of said link, and a second portion extending from the other end of said grooved side of said pulley to the other end of said generally flat end portion of said link and being engageable with the other of said grooves on the side of said pulley and the other of said grooves on the generally flat end portion of said link.

7. A motion-transmitting mechanism comprising a shaft mounted for oscillatory movement, a generally rectangular pulley mounted on said shaft for oscillation therewith, a reciprocable link having a generally flat end portion presentable to a peripheral side of said pulley, and flexible connecting means operatively connecting said link and pulley for oscillation of said pulley and shaft by reciprocation of said link, said flexible means retaining the flat end of the link in contact with a side of the rectangular pulley at the middle position of oscillation of the shaft and in contact with a corner of the rectangular pulley at a position of oscillation on either side of the middle position.

8. A motion-transmitting mechanism comprising a shaft mounted for oscillatory movement, a generally rectangular pulley mounted on said shaft for oscillation therewith, a reciprocable link having a generally flat end portion presentable to a peripheral side of said pulley, and flexible connecting means operatively connecting said link and pulley for oscillation of said pulley and shaft by reciprocation of said link, said rectangular pulley having parallel grooves around its periphery, parallel grooves in the flat end oppositely disposed with respect to the first-mentioned parallel grooves, said oppositely disposed grooves receiving the flexible connecting means therebetween whereby the pulley and flat end are maintained in contact.

9. A motion-transmitting mechanism comprising a shaft mounted for oscillatory movement, a pulley mounted on said shaft for oscillation therewith, said pulley having a generally flat peripheral edge portion and corner portions, a reciprocable link having a generally flat end portion presentable to the flat peripheral edge portion and to the corner portions of said pulley, and flexible connecting means operatively connecting said link and pulley for oscillation of said pulley and shaft by reciprocation of said link, said flat portions lying adjacent and parallel during a middle position of oscillation of the shaft and angularly disposed when oscillated to a position on either side of the middle position when either of said corner portions contact the flat end portion of said link.

10. A motion-transmitting mechanism comprising a shaft mounted for oscillatory movement, a pulley mounted on said shaft for oscillation therewith, said pulley having a generally flat peripheral edge portion, a reciprocable link having a generally flat end portion presentable to the flat peripheral edge portion of said pulley and mating therewith during a portion of each cycle of operation, and flexible connecting means operatively connecting said link and pulley for oscillation of said pulley and shaft by reciprocation of said link, said flexible connecting means including portions extending from opposite ends of said generally flat peripheral edge portion of said pulley to the respective remote opposite ends of said generally flat end portion of said link, and means on the flat surfaces cooperating with the flexible means to prevent relative lateral displacement of the pulley and link end.

References Cited in the file of this patent

UNITED STATES PATENTS

| | | |
|---|---|---|
| 515,449 | Scovell | Feb. 27, 1894 |
| 2,828,635 | Johnson et al. | Apr. 1, 1958 |
| 2,901,764 | Anderson | Sept. 1, 1959 |

FOREIGN PATENTS

| | | |
|---|---|---|
| 18,888 | Great Britain | 1913 |